United States Patent Office 2,879,640
Patented Mar. 31, 1959

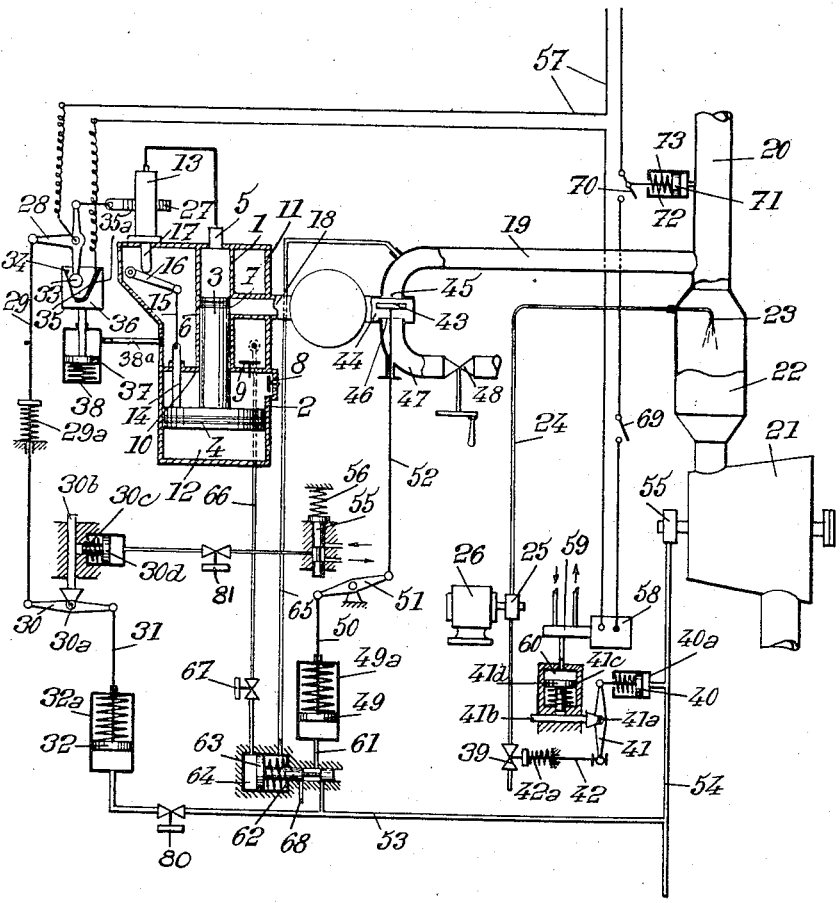

2,879,640

DEVICES FOR THE ADJUSTMENT OF A SYSTEM INCLUDING AT LEAST ONE AUTO-GENERATOR OF POWER GASES AND A RECEIVER MACHINE OPERATED BY SAID GASES

Robert Huber, Bellevue, France, assignor to Societe d'Etudes et de Participations, Eau, Gaz, Electricite, Energie, S.A., Geneva, Switzerland, a society of Switzerland Application August 14, 1953, Serial No. 374,373

Claims priority, application France April 4, 1953

3 Claims. (Cl. 60—13)

The present invention relates to adjustment devices for systems including at least one auto-generator of power gases and a receiver machine operated by said gases. The invention is more especially although not exclusively concerned with adjustment devices for systems of this kind in which the auto-generator is a free piston auto-generator and the receiver machine is a turbine.

In systems of this kind, there are generally several adjustment ranges, each of these ranges corresponding to a predetermined range of loads of the system. Adjustment, in each of these ranges, is obtained either by particular adjustment means corresponding to said range, or by an operation of the adjustment means particular to said range.

For instance, in a system including a free piston auto-generator for producing power gases and a turbine constituting the receiver machine operated by said gases, in the adjustment range corresponding to low loads of the system, the adjustment means maintain the amount of fuel introduced into the auto-generator to its minimum value, this value being of course variable according to the output pressure of the auto-generator and further control the variable opening of a valve which allows an excess of power gases produced by the auto-generator to escape to the outside despite the fact that the amount of fuel fed to the auto-generator is minimum.

In a second adjustment range corresponding to higher loads of the system which extend, in many systems of this kind, up to the maximum load, the exhaust valve, which was more or less opened in the first range of adjustment, is now closed and adjustment takes place exclusively by varying, in accordance with the output pressure of the auto-generator, the amount of fuel fed to said auto-generator.

Finally, there are some systems of the kind above referred to which include a third adjustment range which follows the second mentioned one and within which a supplementary amount of fuel is injected into the power gases delivered by the auto-generator. Inside this third adjustment range, the adjustment means vary the amount of supplementary fuel and control the amount of fuel injected into the motor portion of the auto-generator in such manner that this last mentioned amount corresponds, for every output pressure of said generator, to the maximum amount of gas that can be delivered by it.

The object of the present invention is to achieve shifting from one adjustment range to the next one without shock and in a continuous fashion. For this purpose, according to an essential feature of my invention, the adjustment means which are in operation in a first adjustment range are adapted to start the adjustment means intended to operate in the next adjustment range when said first mentioned adjustment means have reached a position which corresponds to the end of their range of adjustment.

According to another feature of my invention which corresponds especially to the case of a system including several auto-generators adapted to be brought individually into and out of action and serving to deliver gases to a common reservoir or a common receiver machine, and where the output end of every auto-generator can be closed with respect to said common reservoir or receiver machine, by means of a valve, the opening of this valve is controlled in response to variations of the difference between the pressure downstream of said valve and the pressure in the casing which contains the air necessary for feeding and scavenging the power cylinder of the corresponding auto-generator.

Preferred embodiments of my invention will be hereinafter described with reference to the accompanying drawings, given merely by way of example, and in which the only figure diagrammatically shows a system according to my invention and which includes several free piston auto-generators (only one auto-generator is shown in the drawing) and a turbine which constitutes the receiver machine common to these generators.

As above stated, the plant which is shown by the drawing includes a plurality of auto-generators but for the sake of simplicity only one of them has been illustrated. This generator includes a power cylinder 1, and at least one compressor cylinder 2. A movable structure cooperates with these cylinders, this structure including a power piston 3 and a compressor piston 4, these two pistons being rigid with each other, for instance as shown by the drawing. Power cylinder 1, which works on the two stroke cycle and preferably on a diesel cycle, is provided with a fuel injector 5 and in the wall thereof there are formed inlet ports 6 and exhaust ports 7 which are cleared by power piston 3 in the course of its reciprocating movement.

Compressor cylinder 2 is provided with an inlet valve 8 and a discharge valve 9, these valves being advantageously mounted in the partition 10 which separates the inside of compressor cylinder 2 from an air casing 11 which surrounds the power cylinder 1. The compressor space is therefore constituted, in the type of auto-generator illustrated in the figure, by the space existing between said partition 10 and the annular face of compressor piston 4.

It follows that piston 4 sucks in air from the outside through the inlet valves 8 when unit 3—4 is moving outwardly under the effect of the combustion of fuel injected into power cylinder 1, while compression of this air and its discharge past valves 9 into casing 11 takes place when unit 3—4 is moving inwardly.

This inward stroke is produced by the energy stored up in a pneumatic energy accumulator 12 which includes for this purpose an air cushion imprisoned in the outer chamber of cylinder 2, between the outer face of piston 4 and the end of cylinder 2.

The injection pump 13 which supplies fuel to injector 5 is driven by unit 3—4, for instance by means of a rod 14 rigid with piston 4 and which actuates a rod 15 connected to a lever 16, this last mentioned lever acting upon a push-piece 17 rigid with the piston of pump 13. This pump is controlled so that injection takes place when piston 3 is close to the end of its return stroke, that is to say is close to its inner dead center position.

The power gases delivered by the auto-generator enter discharge conduit 18 when piston 3 clears the exhaust ports 7 near the end of its outward stroke. These power gases are constituted by the incompletely expanded combustion gases from power cylinder 1 and by the scavenging air which, after having entered power cylinder 1 through ports 6, flows out therefrom, together with the combustion gases, through ports 7.

It should be noted that, in this example, the auto-generator has been supposed for the sake of simplicity to include a single movable unit but, of course, in practice this auto-generator generally includes, in the well known manner, two movable units, that is to say two pairs of pistons, each pair including a power cylinder and a compressor cylinder, these pairs of cylinders having opposed movements the displacements of which are synchronized through a well known device.

The discharge conduit 18 of each of the auto-generators is connected through a conduit 19 to a common reservoir 20 which communicates with the intake of turbine 21 which constitutes the receiver machine of the system.

Between reservoir 20 and turbine 21 there is interposed a combustion chamber 22 which contains one or several burners 23 by means of which, for high loads of the turbine, a certain amount of fuel is injected into the power gases in order to increase the energy thereof by burning said fuel in the oxygen present in said gases. This supplementary fuel is supplied to burners 23 through a conduit 24 which is supplied by a pump 25 driven by a motor 26.

The adjustment means of the above described system include on the one hand means for adjusting the amounts of fuel injected respectively into the power cylinders of the auto-generators and into combustion chamber 22, and on the other hand valves for allowing an excess of power gases supplied by the auto-generators to escape when the loads of the turbine are low.

The means for adjusting, in every auto-generator, the amount of fuel injected into power cylinder 1, include for instance a control rod 27 connected to one of the arms of a three-armed lever 28, a rod 29 fixed to another arm of this lever and a lever 30 one of the ends of which is connected to rod 29 while its other end is connected by a rod 31 to a piston 32.

The third arm of lever 28 carries an abutment 33 capable of cooperating with two cams 34 and 35 mounted on a support 36 the position of which varies in accordance to variations of the pressure existing in the casing 11 of the auto-generator. For this purpose, the support 36 of these cams 34 and 35 is rigid with a piston 37 movable in a cylinder 38. One of the faces of this piston 37 is subjected to the pressure existing in casing 11 transmitted through a conduit 38a, while the other face of piston 37 is subjected to the action of an antagonistic spring.

Between cams 34 and 35, there is thus provided an interval variable as a function of the pressure in casing 11 and in which abutment 33 and therefore lever 28 can move freely under the effect of the forces acting upon piston 32.

In order to adjust the amount of supplementary fuel injected through burners 23 into combustion chamber 22, I provide a valve 39 controlled by a piston 40 through a lever 41 and a rod 42.

In order to control the exhaust to the atmosphere of a portion of the power gases supplied by the auto-generator, I provide a valve 43 movable in a chamber 44 interposed between the discharge conduit 18 of the auto-generator and the conduit 19 which leads to reservoir 20. The wall of chamber 44 is provided with two ports 45 and 46, either of which can be closed by valve 43. When this valve is in an intermediate position, it simultaneously opens both of these valves partly.

Conduit 19 starts from aperture 45 whereas aperture 46 is connected with a conduit 47 in which is inserted a valve 48 and which opens to the atmosphere.

Valve 43 is operated by means of a piston 49 connected to said valve through a rod 50, a lever 51 and another rod 52.

Control pistons 32, 40 and 49, which cooperate with cylinders 32a, 40a and 49a respectively, and one of the faces of each of which is subjected to the action of a return spring, are actuated by a hydraulic or pneumatic pressure transmitted through a conduit 53 connected to a conduit 54 common to all of the conduits 53 corresponding to the respective auto-generators.

The control impulses are produced in conduit 54 by means of a speed governor 55 driven by turbine 21, this governor working in such manner that the pressure in conduit 54, and consequently of each of the conduits 53, is the higher as the speed of turbine 21 is lower.

Each of the pistons 32, 40 and 49 is to exert its control action for a predetermined adjustment range of the system.

The first range is that corresponding to the starting of the system and low powers supplied by turbine 21. This range is characterized by the fact that the minimum output of power gases of the auto-generator or auto-generators at low feed pressure, such as required by the turbine in this range of adjustment, is however higher than the amount of gas which can be absorbed by the turbine. During this period, I discharge into the atmosphere either the whole or at least a portion of the power gases supplied by each of the auto-generators by opening aperture 46 and the valve 48 of the auto-generator or auto-generators in operation and by fully or partly closing aperture 45 by means of valve 43. Simultaneously, by contact of abutment 33 against cam 34 (this cam corresponding to the minimum output), I keep the fuel injection control rod 27 in each of the auto-generators in the position corresponding to the minimum output for the corresponding output pressure.

In this first adjustment range, only piston 49 and valve 43 have an effect upon the system, whereas pistons 32 and 40 are inoperative, the position of rod 27 depending only upon the contact of abutment 33 against cam 34, and valve 39 being closed.

When the power which is to be supplied by turbine 21 increases, both the amounts of power gases and the pressures of said gases that are necessary for this turbine increase. A time comes where the whole of the gases supplied by each of the auto-generators in operation is to be supplied to the turbine. From this time on, valve 43 fully closes aperture 46 and fully opens aperture 45.

The second adjustment range starts from then on, and in this second range, valve 43 keeps the position which has been given thereto, while the amount of fuel injected to the auto-generator or auto-generators in operation is adjusted exclusively in accordance with the position of the piston 32 of every auto-generator. This position depends upon the control impulses which are transmitted to piston 32 through conduits 54 and 53 from turbine 21. During this period, abutment 33 is located in the interval between cams 34 and 35 without being in contact with either of them. Inside this adjustment range, only the piston 32 of each of the auto-generators in operation controls the adjustment of the system, whereas piston 49 is kept in its final position for which valve 43 closes conduit 47 and piston 40 is still without effect upon valve 39, which is closed.

This period of adjustment lasts until the abutment 33 of each of the auto-generators in operation comes into contact with cam 35 (maximum output cam). At this time, the auto-generator or auto-generators in operation have reached, for the feed pressure required by the turbine at this time, their maximum output. In order to be however able to feed the turbine for still higher loads with power gases having the necessary pressure and volume, it is necessary, in a third adjustment range, to inject supplementary fuel through burners 23, into combustion chamber 22. It is therefore necessary, in this third adjustment range, to have piston 40 open valve 39 in order to achieve a variable injection of supplementary fuel to burner 23. At the same time, abutment 33 remains in contact with cam 35 so that control rod 27 produces in this third range, for every output pressure, the injection of an amount of fuel into the power cylinder of the auto-generator such that this auto-generator supplies the maximum amount of gas it can deliver. During this period, pistons 32 and 49 therefore have no adjustment effect.

In order to shift from one of these adjustment ranges to the next one, without shock and without discontinuity, I cause, according to my invention, the adjustment means which are to operate in a given adjustment range to be started by the adjustment means operating in the preceding adjustment range when these last mentioned means have reached a position which corresponds to the end of their own range.

Of course, such an operation can be obtained in many different ways.

According to a particularly advantageous embodiment, when the adjustment means corresponding to a predetermined range of adjustment are to be brought into action, I fix the position of the pivot axis of a lever belonging to said means, whereas this axis was precedingly freely movable.

For instance, when the piston 49 which controls valve 43 reaches the position corresponding to full opening by this valve of exhaust conduit 47, I fix the position of the pivot axis 30a of lever 30 belonging to the transmission interposed between piston 32 and control rod 27, whereas, up to this time, this pivot axis 30a was freely movable.

In a likewise manner when, under the effect of piston 32, abutment 33 comes into contact with cam 35, I fix in position the pivot axis 41a of lever 41 interposed between piston 40 and valve 39 which determines the amount of fuel injected into combustion chamber 22, whereas up to this time pivot axis 41a was freely movable.

For this purpose, each of these pivot axes, to wit 30a and 41a, is supported by a rod 30b and 41b which is axially slidable in a suitable housing but which may be fixed in this housing by means of a brake or the like 30c and 41c respectively. As long as rods 30b and 41b can slide in their housing, the pivot axes are freely movable and levers 30 or 41 cannot transmit any movement to pistons 32 and 40 respectively. This is due to the fact that, during this period, the levers turn about the hinge through which they are connected respectively to rods 29 and 42, which rods are subjected to the action of a spring 29a and 42a. Spring 29a urges abutment 33 to be into contact with cam 34 and spring 42a urges valve 39 to be in the closed position. However, as soon as rods 30b and 41b and therefore pivot axes 30a and 41a are in fixed position, levers 30 and 41 can turn about their pivot axis in accordance with the movements of pistons 32 and 40.

Locking of rods 30b or 41b by means of the corresponding brake 30c or 41c respectively can be obtained through pneumatic, hydraulic or electrical means.

In the embodiment shown by the drawing, the rod 50 of piston 49 acts, when said piston has reached the position for which valve 43 closes aperture 46, upon a slide valve 55 which is moved against a return spring 56 by the end of this rod 50 so that a fluid under pressure acts upon a piston 30d rigid with brake 30c so as to hold rod 30b and pivot axis 30a in fixed position.

Thus, the fact that valve 43 reaches its full closing position automatically starts the second adjustment means into operation for a period during which the adjustment member 27 is freely controlled by piston 32.

The third adjustment range must start when all the auto-generators of the system have reached their maximum output for a given output pressure. This is why the means for fixing rod 41b and pivot axis 41a in position are advantageously controlled electrically. Each of the abutments 33 of the respective auto-generators, when coming into contact with the corresponding cam 35, closes a contact which is inserted in an electric line 57 which controls a relay or an electro-valve 58 operating a slide valve 59 connected with a source of fluid under pressure. When relay 58 is actuated so as to start the third adjustment means, slide valve 59 admits a fluid under pressure into a cylinder 60 in which is provided a piston 41d, rigid with the braking means 41c acting upon rod 41b.

Of course, the above described means for having the adjustment means of one range controlled by those of the preceding range can be obtained in any suitable manner and they are not limited to the example above described. They may include, in particular, bolts, stopping hooks, and so on, which are retracted or made inoperative at the desired time.

According to another feature of my invention which may be used separately, I provide means for keeping valve system 43—45 closed as long as the pressure in conduit 18 is not close to the pressure existing in conduit 19 which is in free communication with common reservoir 20. It is particularly important to keep valve system 43—45 in closed position up to this time when the system includes a plurality of auto-generators which serve to feed gases to the receiver machine. This necessity is due to the fact that if, in such a system, one of the auto-generators is to be started when other auto-generators of the system are already in operation and are feeding gases to turbine 21, the auto-generator to be started must be connected to reservoir 20 only when the output pressure of this last mentioned auto-generator approximates the pressure existing in said common reservoir.

It has already been proposed, for this purpose, to have the valve the opening of which places the output of the auto-generator into communication with the common reservoir, controlled in response to variations of the pressure difference between the downstream and upstream sides of this valve. However, it was found that such a device is unsatisfactory when the auto-generator which is to be connected to the common reservoir by means of said valve, stops for some accidental reason. In this case, the pressures on the upstream and downstream sides of the valve remain unchanged and the valve, in the known devices, does not close in this case as it should do.

In order to obviate this drawback and according to my invention, I control the means for closing valve 43 in the above indicated cases, in response to variations of the difference between the pressure existing downstream of valve 43 and the pressure existing in the casing 11 of the corresponding auto-generator. This last mentioned pressure quickly drops when the auto-generator stops, which causes valve 43 to be closed.

In order to combine the means which control the closing of valve 43, in response to variations of said pressure difference, with the means which control this valve, in response to variations of the pressure existing in conduit 53, the first mentioned means are advantageously made to act upon conduit 61 which connects conduit 53 with cylinder 49a in which piston 49 is working. For this purpose, I interpose in conduit 61 a slide valve 62 controlled by a piston 63 movable in a cylinder 64. The right hand portion of this cylinder 64 is subjected to the pressure existing in conduit 19 through a conduit 65, and the left hand portion of cylinder 64 is subjected to the pressure existing in the casing 11 of the corresponding auto-generator, through a conduit 66 in which a valve 67 is interposed. When the pressure in casing 11 is close to or higher than said pressure in conduit 19, piston 63 and slide valve 62 are moved toward the right so as to connect together the two portions of conduit 61 extending on either side of said slide valve. Consequently, the pressure existing in conduit 53 can then act upon piston 49 so as to move it in the direction which causes the opening of port 45 and the closing of port 46. On the contrary, as long as the pressure in casing 11 is lower or even only little higher than the pressure in conduit 19, slide valve 62 is moved toward the left, which closes the connection between cylinder 49a and conduit 53 and connects said cylinder 49a with an exhaust orifice 68. The spring which acts upon piston 49 therefore keeps said piston in the position for which valve 43 closes port 45.

The device which has just been described also plays an important part during the starting of the corresponding auto-generator. When the auto-generator is the first one of the system to be started, it is generally advisable, before starting, to close valve 67 and fully to open valve 48. The auto-generator can therefore start without being compelled to exert an important compression effect until it is sufficiently hot. Then, valve 67 is opened, which causes slide valve 62 to move immediately toward the right since the pressure in conduit 19 is then equal to the pressure of the surrounding atmosphere. Piston 49 is therefore immediately subjected to the pressure existing in conduit 53, whereby valve 43 gradually opens port 45 and closes port 46.

When the auto-generator is started at a time where other auto-generators are already in operation and a pressure higher than atmospheric pressure is existing in reservoir 20 and conduit 19, the opening of valve 67 does not immediately cause slide valve 62 to move toward the right, since the pressure which is acting upon the right hand face of piston 63 is higher than the pressure acting on its left hand face. In this case, after the auto-generator has been started, valve 48 is gradually closed, which causes a gradual rise of the output pressure of the auto-generator. When this pressure has become close to the pressure existing in conduit 19, slide valve 62 is moved toward the right and then the pressure existing in conduit 53, acting upon piston 49, moves valve 43 so as to open port 45 and to close port 46.

In order to obtain a satisfactory operation, during the starting periods, I further provide in conduit 53, upstream of cylinder 32a, a valve 80 which makes it possible to leave piston 32 free from the control pressures existing in conduits 53 and 54. I may also, during these periods, cause a pressure other than that determined by the governor 55 of turbine 21 to act upon piston 32. It may then be advantageous to be able to prevent brake 30c to be operated by its control pressure, even when piston 49 is in its upper position, for which valve 43 fully opens port 45. For this purpose, I may provide a valve 81 in the conduit which feeds fluid under pressure to the piston 30d of brake 30c.

Finally, concerning the electric circuit 57 of electro-valve 58, I insert therein a switch 69 which can be operated at will by the operator and another switch 70 controlled by the pressure existing in reservoir 20. For this purpose, switch 70 is actuated by a piston 71 movable in a cylinder 72 which, on one side, is subjected to the action of the pressure existing in reservoir 20 and, on the other side, is subjected to the action of a spring 73.

The opening of switch 69 makes it possible to prevent the introduction of supplementary fuel into combustion ing the starting periods where abutments 33 might contact cam 35 in order to ensure a high output of power chamber 22 at any desired moment and in particular during gases. Switch 70 makes it possible to stop injection of fuel into combustion chamber 22 if, for an accidental reason, all the auto-generators stop, which would produce in reservoir 20 a pressure drop down to the pressure of the surrounding atmosphere.

Finally, when the devices 33—35 of the auto-generators are mounted in series in electric circuit 57, the contact strip 35a is extended along cam 35 to the bottom of the interval between cams 34 and 35 so that the contact is not stopped when one of the auto-generators is stopped for an accidental reason, which would cause the support 36 of cams 34—35 to rise and would bring abutment 33 in contact with the bottom of said interval.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a system including a frame, at least one auto-generator of power gases carried by said frame, a receiver machine carried by said frame and to be operated by such power gases, and conduit means for connecting the output of said generator with the intake of said receiver machine, said system having at least two adjustment ranges corresponding to two different ranges of the load of said receiver machine respectively, the combination of at least two distinct means for adjustment of the operation of said system within said adjustment ranges respectively, each of said means including a movable part to be displaced between a lower limit and an upper limit position, one of said adjustment means being inoperative when the other adjustment means is in action, and means operative by the movable part of said other mentioned means in its upper limit position for starting into operation said one adjustment means corresponding to the next adjustment range, said one adjustment means including a transmission lever, a rod slidable in said frame carrying the pivot axis of said lever whereby said lever is inoperative when said rod is freely slidable in said frame, and means operative by the movable part of said other adjustment means in its upper limit position for holding said rod in fixed position with respect to said frame.

2. A system comprising, in combination, at least one auto-generator of power gases including an internal combustion power unit of the free piston type having an air intake and an exhaust gas output, means for feeding fuel to said power unit, an air compressor unit of the piston type, said power and compressor units having their respective pistons rigid with one another, said compressor unit having its output connected with said power unit air intake, a gas turbine, conduit means for connecting said power unit output with the intake of said turbine, a discharge valve interposed between said conduit means and the external atmosphere, means responsive to variations of the load of said turbine for controlling said discharge valve to open it as long as said load is below a predetermined value and to close it for values of said load above said value, means operatively connected with said fuel feeding means for controlling the rate of fuel feed to said power unit, said fuel feed controlling means including a movable fuel feed control member, a part movable in response to variations of the working pressure of said auto-generator, said member and said part having respective surfaces capable of cooperating together in cam and follower fashion to give said member a position achieving the minimum fuel feed rate for the existing working pressure of said generator, resilient means for applying said member against said part, means responsive to variations of the load of said turbine for controlling the position of said fuel feed control member, said last mentioned means being inoperative as long as said discharge valve is open, and means operatively connected with said discharge valve for making said last mentioned means operative when said valve is closed, whereby said fuel feed control member is moved away from said part against the action of said resilient means and in accordance with the load of said turbine above said predetermined value.

3. A system comprising, in combination, at least one auto-generator of power gases including an internal combustion power unit of the free piston type having an air intake and an exhaust gas output, means for feeding fuel to said power unit, an air compressor unit of the piston type, said power and compressor units having their respective pistons rigid with one another, said compressor unit having its output connected with said power unit air intake, a gas turbine, conduit means for connecting said power unit output with the intake of said gas turbine, means operatively connected with said fuel feeding means for controlling the rate of fuel feed to said power unit, said fuel feed controlling means including a movable fuel control member, a part movable in response to variations of the working pressure of said auto-generator, said member and said part having respective surfaces capable of cooperating together in cam and follower fashion to give said member a position achieving the maximum fuel feed rate for the existing working pressure of said generator, means responsive to variations of the load of said gas turbine for controlling the position of said fuel feed control member, said last mentioned means being adjusted to position said member at a distance from said part depending upon the load of said gas turbine as long as said load is below a predetermined value and to apply said member against said part for values of said load at least equal to said predetermined value, a combustion chamber inserted in said conduit means extending between said auto-generator and said turbine, supplementary fuel feed means opening into said combustion chamber, means responsive to variations of the load of said turbine for controlling said supplementary fuel feed means in accordance with the value of said load, said last mentioned means being inoperative as long as said fuel feed control member is out of contact with said part and means responsive to contact of said member with said part for making said last mentioned means operative as long as said member is applied against said part, whereby fuel is then supplied by said supplementary fuel feed means at a rate dependent upon the load of said turbine.

References Cited in the file of this patent

UNITED STATES PATENTS

| | | |
|---|---|---|
| 2,374,708 | Shoults | May 1, 1945 |
| 2,474,697 | Schwendner | June 28, 1949 |
| 2,562,742 | Rowe et al. | July 31, 1951 |
| 2,567,486 | Johansson | Sept. 11, 1951 |
| 2,738,644 | Alford | Mar. 20, 1956 |
| 2,745,246 | Huber | May 15, 1956 |

FOREIGN PATENTS

| | | |
|---|---|---|
| 595,627 | Great Britain | Dec. 11, 1947 |